United States Patent
Lee et al.

(10) Patent No.: US 11,589,028 B2
(45) Date of Patent: Feb. 21, 2023

(54) NON-SAME CAMERA BASED IMAGE PROCESSING APPARATUS

(71) Applicant: LG ELECTRONICS INC., Seoul (KR)

(72) Inventors: Chaedeok Lee, Seoul (KR); Jongmyoung Park, Seoul (KR); Sangwon Seo, Seoul (KR); Woodeok Joo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/418,185

(22) PCT Filed: Aug. 23, 2019

(86) PCT No.: PCT/KR2019/010745
§ 371 (c)(1),
(2) Date: Jun. 24, 2021

(87) PCT Pub. No.: WO2020/159024
PCT Pub. Date: Aug. 6, 2020

(65) Prior Publication Data
US 2022/0070435 A1    Mar. 3, 2022

(30) Foreign Application Priority Data
Feb. 1, 2019 (KR) .......... 10-2019-0013518

(51) Int. Cl.
*H04N 13/25* (2018.01)
*H04N 13/257* (2018.01)
(Continued)

(52) U.S. Cl.
CPC .......... *H04N 13/25* (2018.05); *G06V 10/147* (2022.01); *G06V 10/98* (2022.01); *G06V 20/647* (2022.01);
(Continued)

(58) Field of Classification Search
CPC .. H04N 13/25; H04N 5/23218; H04N 13/257; H04N 13/296; H04N 2013/0074;
(Continued)

(56) References Cited

U.S. PATENT DOCUMENTS

| 9,976,967 B2 | 5/2018 | Bense et al. |
| 2016/0052452 A1* | 2/2016 | Oh .......... B60R 1/00 |
| | | 348/148 |
| 2018/0268237 A1* | 9/2018 | Stanimirovic .......... G06T 7/11 |

FOREIGN PATENT DOCUMENTS

| JP | 2018106239 | 7/2018 |
| KR | 1020150068550 | 6/2015 |

(Continued)

OTHER PUBLICATIONS

PCT International Application No. PCT/KR2019/010745, International Search Report dated Dec. 18, 2019, 9 pages.

*Primary Examiner* — Susan E. Torgerson
(74) *Attorney, Agent, or Firm* — Lee Hong Degerman Kang & Waimey

(57) ABSTRACT

The present invention provides an image processing apparatus comprising: a first camera obtaining a true-color image by capturing a subject; a second camera spaced apart from the first camera and obtaining an infrared image by capturing the subject; and a control unit connected to the first camera and the second camera, wherein the control unit matches the true-color image and the infrared image and obtains three-dimensional information of the subject by using the matched infrared image in a region corresponding to the matched true-color image and a valid pixel.

11 Claims, 9 Drawing Sheets

(51) Int. Cl.
*H04N 13/296* (2018.01)
*G06V 20/64* (2022.01)
*H04N 5/232* (2006.01)
*G06V 10/98* (2022.01)
*G06V 10/147* (2022.01)
*H04N 13/00* (2018.01)

(52) U.S. Cl.
CPC ....... *H04N 5/23218* (2018.08); *H04N 13/257* (2018.05); *H04N 13/296* (2018.05); *H04N 2013/0074* (2013.01)

(58) Field of Classification Search
CPC ........... H04N 2013/0081; H04N 5/247; H04N 5/332; H04N 13/239; H04N 5/33; G06V 10/147; G06V 10/98; G06V 20/647; G06V 10/143; G06V 10/803; G06V 20/58
USPC ...................................... 348/17, 47
See application file for complete search history.

(56) References Cited

FOREIGN PATENT DOCUMENTS

KR   1020150079638   7/2015
KR   101796523   11/2017

\* cited by examiner

FIG. 1 - PRIOR ART -

FIG. 5
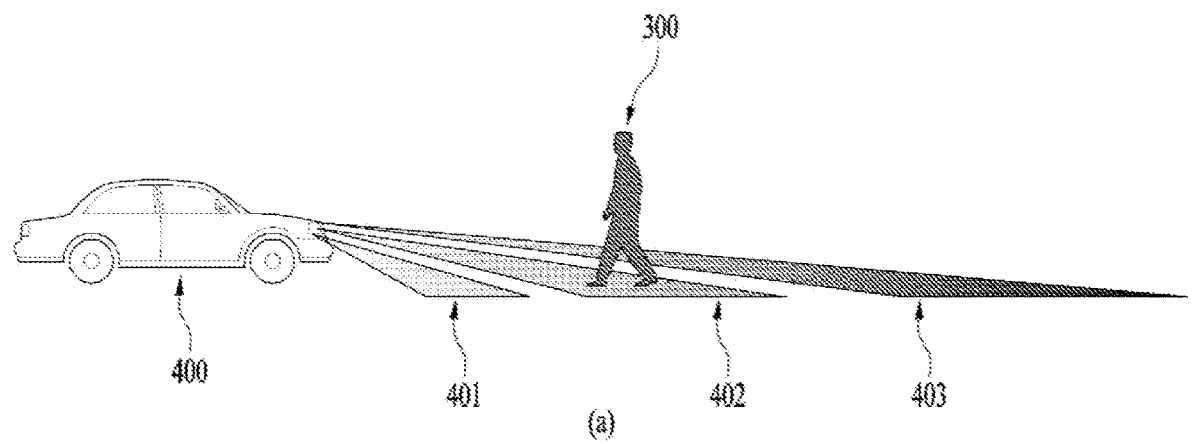
(a)
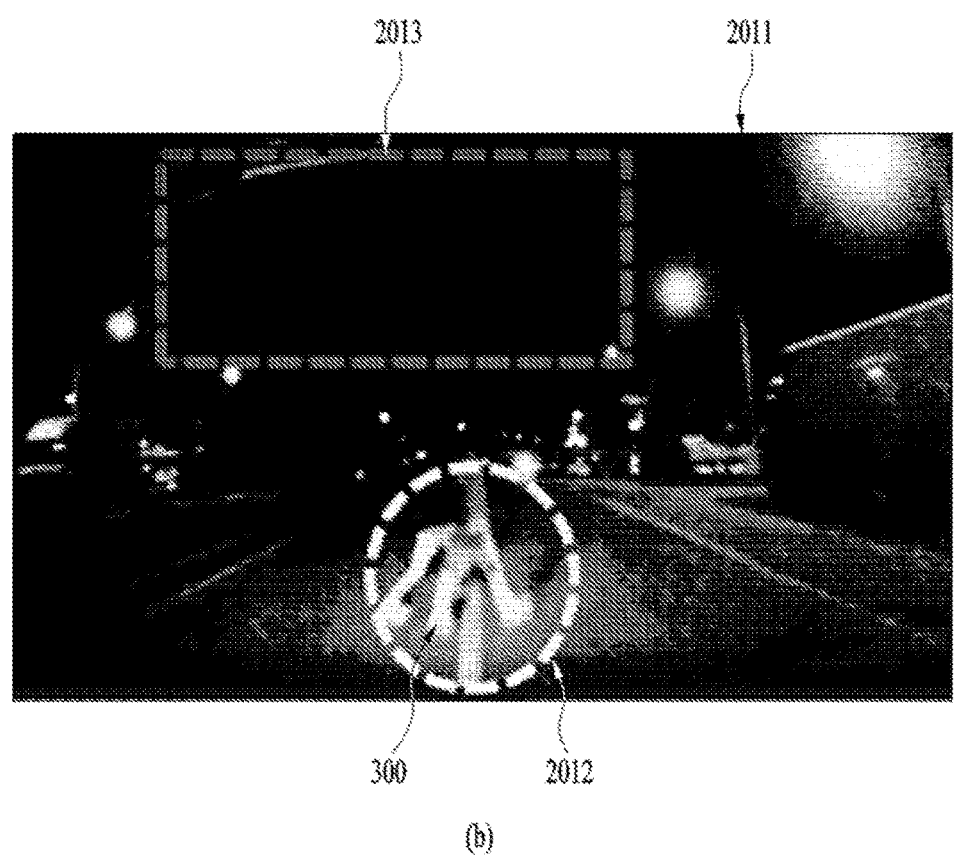
(b)

FIG. 6
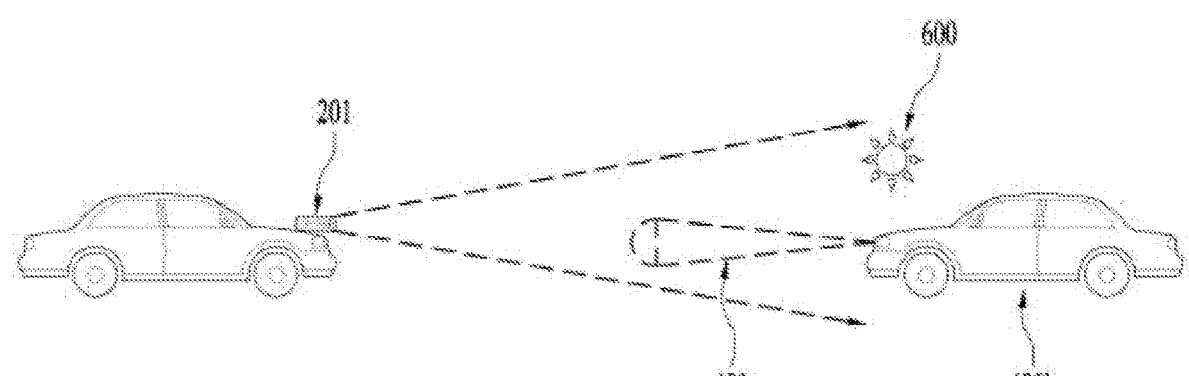
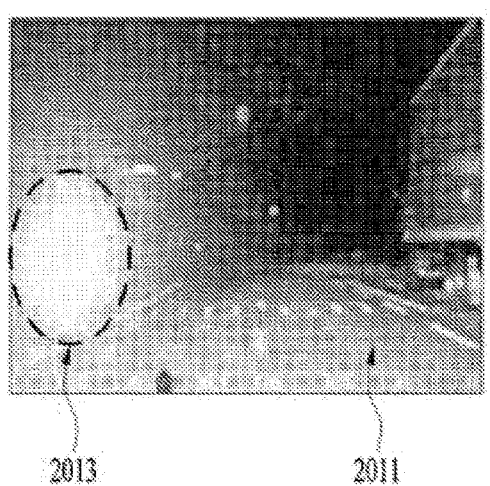
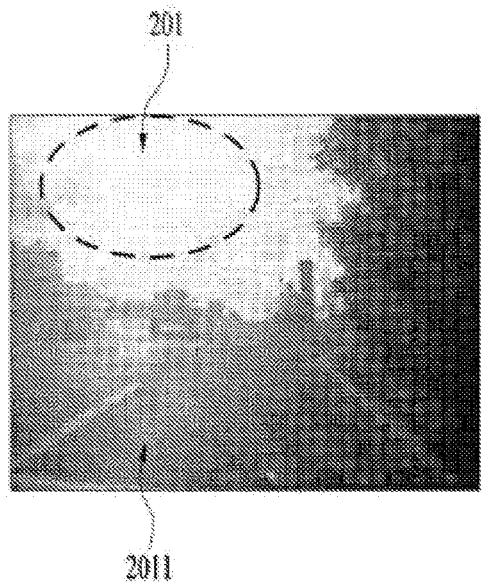

FIG. 9
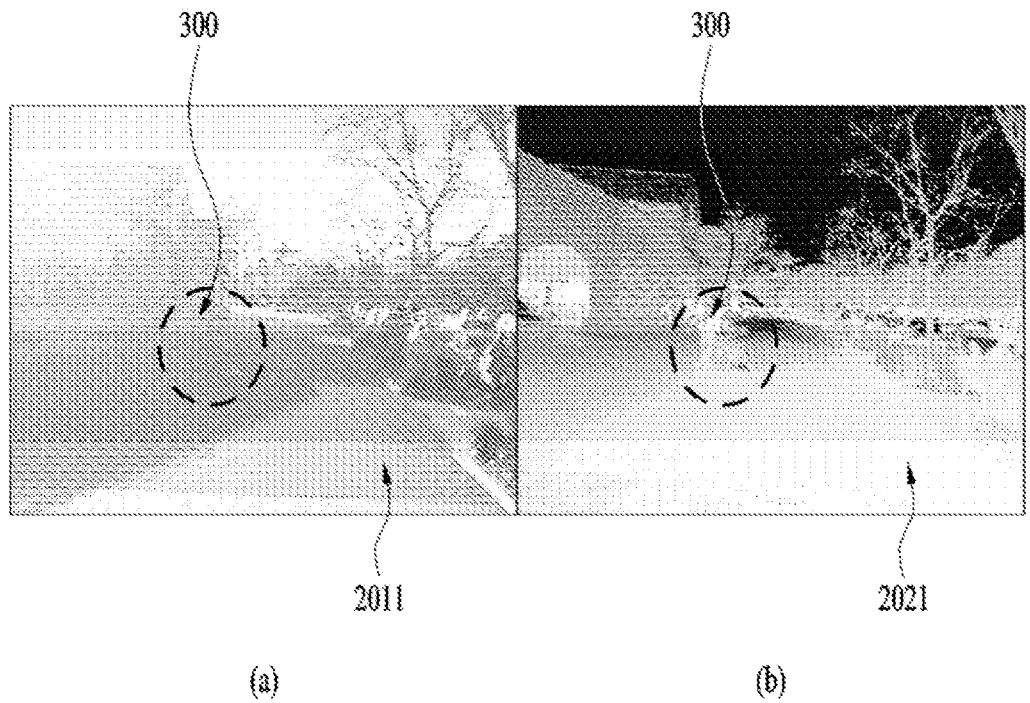
(a)        (b)
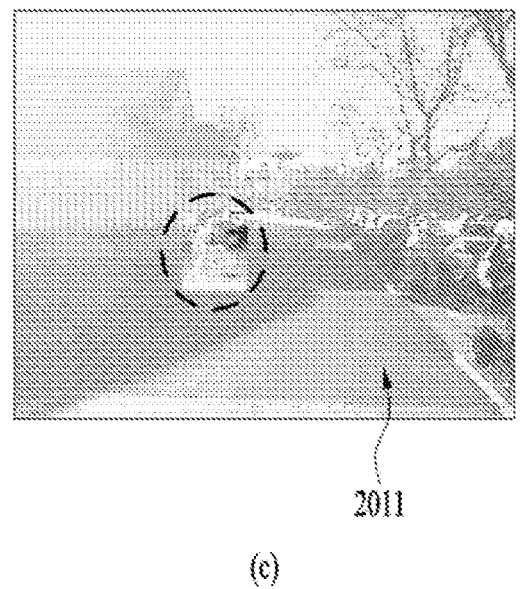
(c)

NON-SAME CAMERA BASED IMAGE PROCESSING APPARATUS

CROSS-REFERENCE TO RELATED APPLICATIONS

This application is the National Stage filing under 35 U.S.C. 371 of International Application No. PCT/KR2019/010745, filed on Aug. 23, 2019, which claims the benefit of earlier filing date and right of priority to Korean Application No. 10-2019-0013518 filed on Feb. 1, 2019, the contents of which are all incorporated by reference herein in their entirety.

TECHNICAL FIELD

The present disclosure relates to an image processing apparatus based on non-identical cameras. Particularly, the present disclosure is applicable to a technical field for extracting either or both two-dimensional information and three-dimensional information based on a red, green, and blue (RGB) camera and an infrared camera.

BACKGROUND ART

Humans are capable of seeing things three-dimensionally based on disparity between the two eyes. In recent years, a stereo vision camera that calculates distance information with two cameras according to such a principle has been widely used.

FIG. 1 shows an embodiment of a conventional stereo vision camera.

The stereo vision camera may include two cameras 101 and 102 spaced apart from each other by a predetermined distance d1. The stereo vision camera may capture a subject 300 that exists in an area 500 captured by the two cameras, and calculate disparity between images captured by the two cameras, and obtain a distance d2 from the cameras 101 and 102 to the subject 300.

To measure the distance to the subject based on the disparity, epipolar geometry, which is a well-known technique, may be employed.

However, since the conventional stereo vision camera matches two images based on the same camera, it is difficult to overcome limitations from the use of a single camera type (single band).

For example, stereo vision based on red, green, and blue (RGB) cameras has a problem in visibility at night, and stereo vision based on infrared cameras has a problem in color recognition.

Therefore, a dual-band stereo vision system has been introduced. The dual-band stereo vision system is a stereo vision system that includes both the stereo vision based on RGB cameras and the stereo vision based on infrared cameras.

However, the dual-band stereo vision system has disadvantages in that an image processing apparatus has a large volume and weight, high cost is required, and it is difficult to match images acquired in each band.

DISCLOSURE

Technical Problem

The object of the present disclosure is to provide an image processing apparatus based on non-identical cameras. Specifically, the object of the present disclosure is to obtain complementary two-dimensional information from each camera and obtain three-dimensional information from matched image information.

Technical Solution

In an aspect of the present disclosure, an image processing apparatus is provided. The image processing apparatus may include a first camera configured to capture a subject and obtain a true color image, a second camera spaced apart from the first camera and configured to capture the subject and obtain an infrared image, and a controller connected to the first camera and the second camera. The controller may be configured to match the true color image and the infrared image and obtain three-dimensional information about the subject in an area corresponding to effective pixels of the matched true color image from the matched infrared image.

The effective pixels may be pixels that absorbs light more than or equal to a minimum amount of light for identifying an object and less than or equal to a saturation amount of light The controller may be configured to coordinate a representative pixel of the subject among the effective pixels to the infrared image and obtain the three-dimensional information based on stereo vision operation.

The representative pixel may include at least one of an outline pixel of the subject and a center pixel of the subject.

When a shape of a specific object is recognized in the area corresponding to the effective pixels, the controller may be configured to detect whether the shape of the specific object actually corresponds to the specific object based on information about a related area in the matched infrared image.

The controller may be configured to obtain two-dimensional information about an area corresponding to abnormal pixels of the matched true color image from the matched infrared image.

The two-dimensional information may include information about presence of a specific object in the area corresponding to the abnormal pixels.

When the presence of the specific object is detected from the two-dimensional information, the controller may be configured to convert the abnormal pixels into effective pixels by adjusting an aperture of the first camera.

After adjusting the aperture of the first camera, the controller may be configured to obtain three-dimensional information about the specific object present in the area corresponding to the abnormal pixels.

When the presence of the specific object is detected from the two-dimensional information, the controller may be configured to convert the abnormal pixels into effective pixels based on raw data for obtaining the true color image and obtain three-dimensional information about the specific object present in an area corresponding to the converted effective pixels.

The image processing apparatus may include an output interface. When the presence of the specific object is detected from the two-dimensional information, the controller may be configured to output information about the specific object to a user through the output interface.

The output interface may include a display module configured to display the true color image, and the controller may be configured to overlap and display an infrared image of the specific object in the area corresponding to the abnormal pixels.

The first camera may be a camera configured to detect visible light and near-infrared (NIR) light.

The second camera may be a camera configured to detect at least one of far-infrared (FIR) light, mid-wave infrared (MWIR) light, or short-wavelength infrared (SWIR) light.

Advantageous Effects

The present disclosure provides a solution for obtaining complementary two-dimensional information based on non-identical cameras.

The present disclosure provides a solution for obtaining three-dimensional information based on non-identical cameras.

The additional applicability of the present disclosure will become apparent from the detailed description given hereinafter. However, it should be understood that the detailed description and specific examples such as preferred embodiments of the present disclosure are given by way of illustration only, since various changes and modifications within the spirit and scope of the present disclosure will become apparent to those skilled in the art from this detailed description.

DESCRIPTION OF DRAWINGS

FIGS. 5 and 6 are views for explaining effective and abnormal pixels of a true color image obtained by the non-identical stereo vision camera according to the present disclosure.

FIG. 9 is a view showing an embodiment in which a specific object is emphasized and output based on an infrared image when the specific object is detected from a true color image obtained by the non-identical stereo vision camera according to the present disclosure.

BEST MODE

Hereinafter, embodiments of the present disclosure will be described in detail with reference to the attached drawings. In this specification, the same or equivalent components will be provided with the same reference numbers, and description thereof will not be repeated. The suffixes "module" and "unit" of elements herein are used for convenience of description and thus may be used interchangeably and do not have any distinguishable meanings or functions. If it is determined that detailed descriptions of the related art obscure the gist of the present disclosure, the detailed descriptions will be omitted. It should also be understood that the attached drawings are merely to provide better understanding of the embodiments of the present disclosure and the spirit of the present disclosure is not limited to the attached drawings. Thus, the present disclosure should be construed to extend to any alterations, equivalents and substitutes in addition to those which are particularly set out in the accompanying drawings.

The following embodiments of the present disclosure are intended to embody the present disclosure, not limiting the scope of the present disclosure. What could easily be derived from the detailed description of the present disclosure and the embodiments by those skilled in the art is interpreted as falling within the scope of the present disclosure.

The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Figure 1:
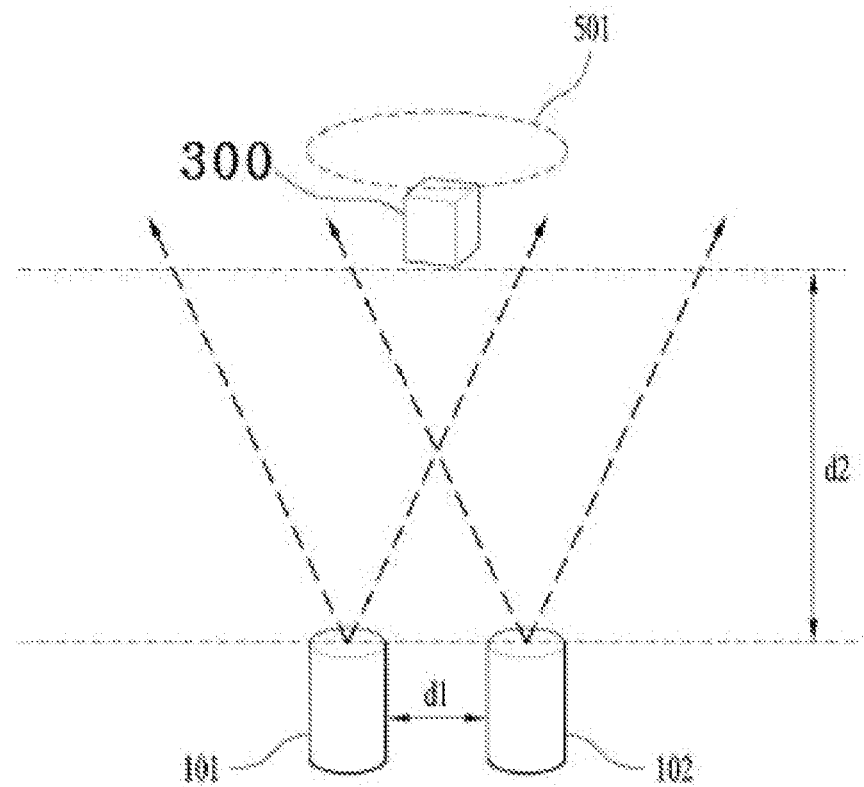
FIG. 1 shows an embodiment of a conventional stereo vision camera.
Figure 2:
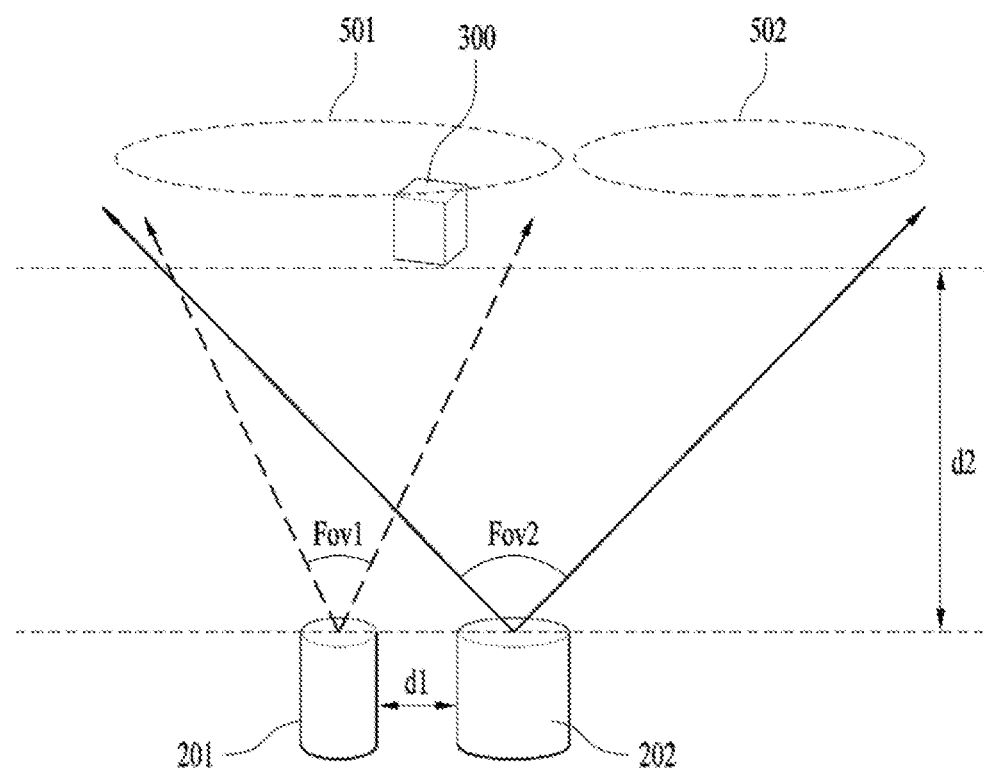
FIG. 2 shows an embodiment of a non-identical stereo vision camera according to the present disclosure.

FIG. 2 shows an embodiment of a non-identical stereo vision camera according to the present disclosure.

The non-identical stereo vision camera according to the present disclosure may include two non-identical cameras configured to detect different wavelength bands.

One of the two non-identical cameras may be a first camera 201 configured to obtain a true color image by capturing a subject 300. The other may be a second camera 202 spaced apart from the first camera 201 by a predetermined distance d1 and configured to obtain an infrared image by capturing the subject 300.

Specifically, the first camera 201 may be a camera that detects visible light or a camera that detects visible light and near-infrared (NIR) light. That is, the true color image may be an image obtained by detecting visible light, or an image obtained by detecting visible light and NIR light. Here, the NIR light refers to light with a wavelength between about 0.7 and 1.0 um.

The first camera 201 may include a complementary metal-oxide semiconductor (CMOS) image sensor (CIS) that detects visible light. Alternatively, the first camera 201 may be a camera with high visibility by extending a detection wavelength from visible light to NIR light.

The second camera 202 may be a camera that detects far-infrared (FIR) light, or a camera that detects mid-wave infrared (MWIR) light or short-wavelength infrared (SWIR) light. Here, the FIR light refers to light with a wavelength between about 8 and 14 um, the MWIR light refers to light with a wavelength between about 3 and 5 um, and the SWIR light refers to light with a wavelength between about 1.0 and 2.5 um.

A camera that detects FIR light and SWIR light shows excellent performance in identifying day/night pedestrians, and thus it may be used as night vision equipment.

The field of view (FOV1) of the first camera 201 may not need to be the same as the field of view (FOV2) of the second camera 202. However, when the two cameras have different FOVs, image information needs to be compared and matched based on singularities of the acquired images. Details will be described later with reference to FIG. 4.

When the subject 300 exists in a first area 501 captured by both the first camera 201 and the second camera 202, a distance d2 from the non-identical stereo camera to the subject 300 may be calculated based on disparity between the images obtained by the first camera 201 and the second camera 202.

The distance d2 to the subject 300 may be obtained based on stereo calculation as follows. Pixels of the subject 300 are extracted from both the true color image obtained by the first camera 201 and the infrared image obtained by the second camera 202, and then information about the distance d2 may be obtained based on disparity of the corresponding pixels.

Here, the pixel may be a center pixel or at least one of pixels constituting the outline of the subject 300. Details will be described later with reference to FIG. 7.

In a second area 502 captured by only one of the first camera 201 and the second camera 202, two-dimensional (2D) information may be obtained from the photographing camera. FIG. 2 shows an embodiment in which the second area 502 is photographed only by the second camera 202, and in this case, only 2D information included in the infrared image may be acquired from the second area 502. In contrast, when the second area 502 is captured only by the first camera 201, only 2D information included in the true color image may be acquired from the second area 502.

For the first area 501, the second camera 202 may obtain complementary 2D information when no 2D information is obtained by the first camera 101. Alternatively, the second camera 202 may be used to check 2D information acquired by the first camera 101. Details will be described later with reference to FIG. 3.

Figure 3:
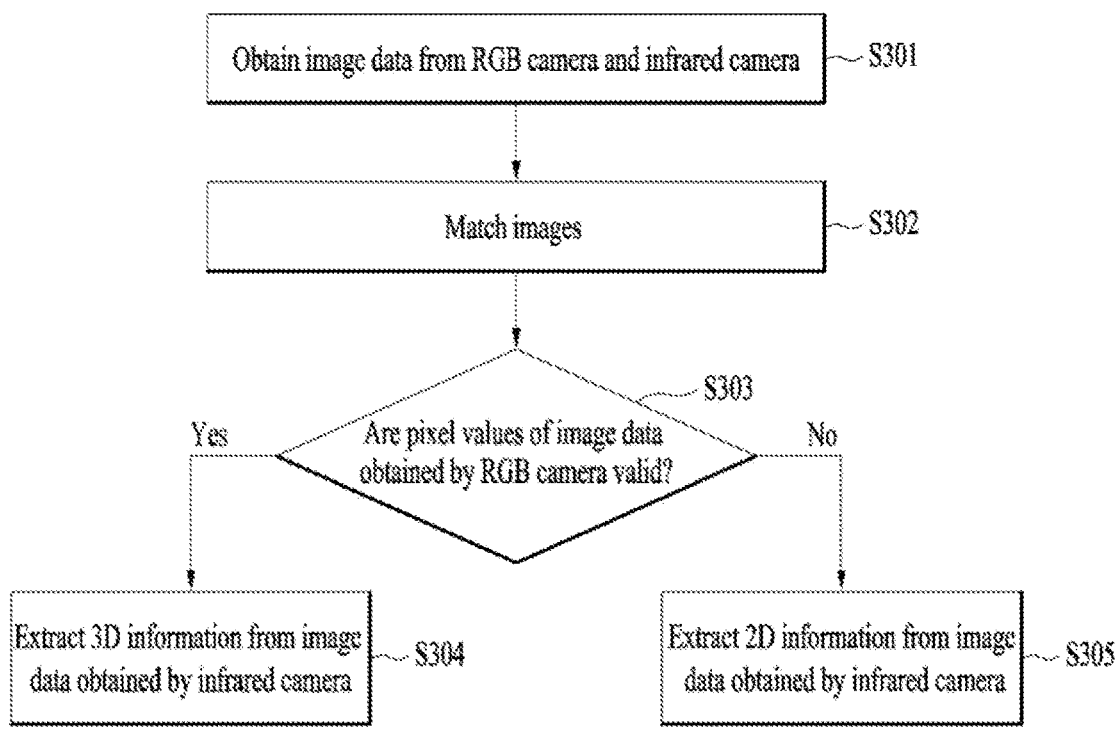
FIG. 3 is a flowchart illustrating a method of acquiring two-dimensional (2D) information and three-dimensional (3D) information through the non-identical stereo vision camera according to the present disclosure.

FIG. 3 is a flowchart illustrating a method of acquiring 2D information and three-dimensional (3D) information through the non-identical stereo vision camera according to the present disclosure.

Specifically, FIG. 3 is a flowchart illustrating a method of acquiring 2D information and 3D information through the non-identical stereo vision camera according to the present disclosure shown in FIG. 2.

The non-identical stereo vision camera according to the present disclosure may acquire image data from the first camera 201 and the second camera 202 (S301). The first camera 201 may be a red, green, and blue (RGB) camera or a camera with an extended wavelength which is capable of detecting NIR light. The second camera 202 is an infrared camera that detects infrared wavelengths or a camera that detects FIR light or SWIR light.

Since the first camera 201 and the second camera 202 are different cameras, the image data obtained thereby may need to be matched (S302). This is a process of matching corresponding pixels of the image data. The matching process may be based on the singularity of each image data.

According to the present disclosure, 3D information or 2D information may be obtained depending on pixel values of the image data obtained by the first camera 201. Here, the 2D information may include identification information about moving objects such as pedestrians and vehicles and identification information about fixed background objects such as buildings and traffic lights. Additionally, the 2D information may include text information for identifying signals and signs.

Specifically, when the pixel values of the image data obtained by the first camera 201 are valid (YES in S303), 3D information may be obtained from the image data acquired by the second camera 202 (S304).

On the other hand, when the pixel values of the image data obtained by the first camera 201 are not valid (NO in S303), 2D information may be obtained from the image data acquired by the second camera 202 (S305).

In this case, whether the pixel values of the image data acquired by the first camera 201 are valid may be checked based on the amount of light absorbed by pixels. That is, when the amount of light absorbed by a pixel is more than or equal to the minimum amount of light for identifying objects and less than or equal to the saturation amount of light, the pixel may be considered to be effective.

Since the first camera 201 acquires true color images, the amount of light becomes an important factor in identifying objects. For a true color image, it is difficult to identify objects in an extremely bright area (i.e., an area corresponding to light saturation pixels) or in an extremely dark area (i.e., area corresponding to pixels less than or equal to the minimum amount of light). Here, the amount of light means the amount of light in visible light bands NIR light bands.

On the other hand, since the second camera 202 acquires infrared images, the second camera 202 has lower dependence on visible light illuminance in identifying objects than the first camera 201. In particular, a FIR camera may use a passive device that requires no external light sources, and an MWIR or SWIR camera may obtain a clear image even when the visible light illuminance is low or use an extra transmitter to obtain a clear image. Therefore, such cameras may be used to identify objects instead of the first camera 201 in the light saturation area or an area where the amount of light is less than or equal to the minimum amount of light.

Thus, when the subject 300 exists in an area corresponding to effective pixels of the image data acquired by the first camera 201, the subject 300 may be identified by the first camera 201 and the second camera 202, and information about the distance to the subject 300, i.e., 3D information may be obtained based on binocular disparity between the two cameras.

However, if the subject 300 exists in an area corresponding to abnormal pixels of the image data acquired by the first camera 201, the subject 300 may not be identified by the first camera 201. Thus, the second camera 202 is used to identify the subject 300. In this case, it is difficult to obtain 3D information because the subject 300 is identified by one camera, but it may be useful in that complementary 2D information is obtained.

Similarly, when the subject 300 is not identified based on the image data acquired by the second camera 202, the first camera 101 may be used to identify the subject 300. That is, complementary 2D information about the image data acquired by the second camera 202 may be obtained by the first camera 101.

Figure 4:
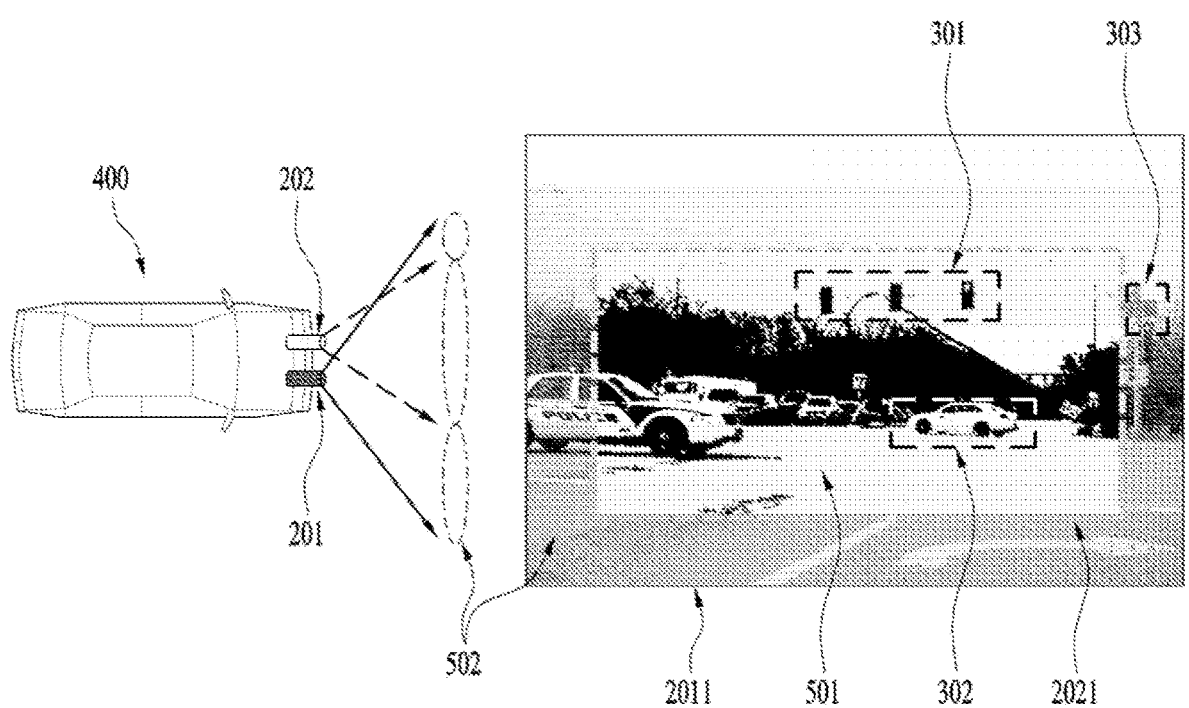
FIG. 4 shows matching of true color and infrared images obtained by the non-identical stereo vision camera according to the present disclosure.

FIG. 4 shows matching of true color and infrared images obtained by the non-identical stereo vision camera according to the present disclosure.

FIG. 4(*a*) shows an embodiment in which the non-identical stereo vision camera according to the present disclosure is provided in a vehicle 400, and FIG. 4(*b*) shows matching of image data obtained by the stereo vision camera according to the present disclosure while the vehicle 400 is driving.

Specifically, FIG. 4(*b*) shows superimposition of a true color image 2011 acquired by the first camera 201 and an infrared image 2021 acquired by the second camera 202. In FIG. 4(*b*), the true color image 2011 and the infrared image 2021 are matched to visually represent image data corresponding to the first area 501 and image data corresponding to the second area 502, but the image shown in FIG. 4 is not provided to a user.

The true color image 2011 and the infrared image 2021 may be matched based on singularities of subjects 301 and 302. However, since the first camera 201 and the second camera 202 are spaced apart by a predetermined distance and capture the subjects 301 and 302, disparity may be present between the matching singularities.

FIG. 5 shows an embodiment in which the FOV of the first camera 201 is larger than the FOV of the second camera 202. For the second area 502 captured only by the first camera 201, only 2D information may be obtained from the true color image 2011 acquired by the first camera 201.

Specifically, a signboard 303 in the second area 502 may be identified based on the true color image 2011 acquired by the first camera 201, and text information included in the signboard 303 may be extracted.

3D information about the subjects 301 and 302 may be obtained from the first area 501 captured by both the first camera 201 and the second camera 202.

Specifically, a traffic light 301 and a vehicle 302 may be identified, and distance information may also be obtained. In addition, complementary 2D information may be obtained by each camera. For example, the color of the traffic light 301 may be identified from the true color image 2011 obtained by the first camera 201, and additional information for identifying the vehicle 302 may be obtained from the infrared image 2021 acquired by the second camera 202.

However, in some cases, it may be difficult to identify the subjects 301 and 302 in the first area 501 through the first camera 501. That is, if the subjects 301 and 302 are in an area that is too dark or too bright, it may be difficult to identify the subjects 301 and 302 through the first camera 201.

Therefore, the present disclosure proposes the following technical idea: classifying effective pixels based on the amount of light in a true color image acquired from the first camera 201, obtaining 3D information in an area corresponding to the effective pixels, and obtaining complementary 2D information in an area corresponding to abnormal pixels.

FIGS. 5 and 6 are views for explaining effective and abnormal pixels of a true color image obtained by the non-identical stereo vision camera according to the present disclosure.

When the vehicle 400 is driving at night, effective pixels of the true color image 2011 obtained by the first camera 201 may vary depending on not only the reach of headlight beams 401, 402, and 403 but also ambient lighting as shown in FIG. 5(a).

FIG. 5(b) shows the true color image 2011 obtained by the vehicle 400 in correspondence with FIG. 5(a). For convenience of description, the true color image 2011 shown in FIG. 5(b) is regarded as an image corresponding to the first area 501.

Referring to FIG. 5(b), the true color image 2011 includes an area 2013 in which no objects are identified due to an insufficient amount of light and an area 2012 in which objects are identified due to a proper amount of light. The area 2013 in which no objects are identified and the area 2012 in which objects are identified may not overlap with each other and be included in the first area 501.

The area 2012 having the amount of light suitable for identifying objects may correspond to effective pixels, and 3D information about the subject 300 in the area 2012 may be obtained from the second camera 202.

The area 2013 in which no objects are identified due to the insufficient amount of light may correspond to abnormal pixels, so that it is difficult to obtain 2D information through the first camera 201. Thus, in the area 2013, complementary 2D information may be acquired by the second camera 202.

For example, when there is a pedestrian in the area 2013 in which no objects are identified due to the insufficient amount of light, the pedestrian may be recognized by the second camera 202.

FIG. 6 shows an embodiment in which the area 2013 where no objects are identified occurs in the true color image 2011 due to light saturation.

When a headlight beam 401 of a vehicle 400b driving in the opposite direction is strong or when backlight or ambient lighting (600) is strong, objects may not be identified in the true color image 2011 due to the light saturation.

For the area 2013 in which no objects are identified due to the light saturation, 2D information may be obtained by the second camera 202.

In other words, the non-identical stereo vision camera according to the present disclosure may complementarily obtain 2D information, which may not be obtained by the first camera 201 when the amount of light is less than or equal to the maximum level or more than or equal to the saturation level.

It may also be considered that abnormal pixels are converted into effective pixels by adjusting the amount of light in an area corresponding to the abnormal pixels.

To this end, when it is determined by the second camera 202 that a specific object exists in the area 2013 corresponding to abnormal pixels, the area 2013 corresponding to abnormal pixels may be converted into the area 2012 corresponding to effective pixels by adjusting the aperture of the first camera 201.

When the area 2013 corresponding to abnormal pixels is converted to the area 2012 corresponding to effective pixels by the adjustment of the aperture, 3D information about the specific object in the converted area may be obtained from the infrared image 2012 acquired by the second camera 202.

When it is determined by the second camera 202 that a specific object exists in the area 2013 corresponding to abnormal pixels, the corresponding area 2013 may be converted into the area 2012 corresponding to effective pixels based on raw data of the obtained true color image.

When the area 2013 corresponding to abnormal pixels is converted to the area 2012 corresponding to effective pixels based on the raw data, 3D information about the specific object in the converted area may be obtained from the infrared image 2012 acquired by the second camera 202.

Hereinafter, a method of acquiring 3D information (distance information) about the subject 300 from the true color image 2011 obtained by the first camera 201 and the infrared image 2012 obtained by the second camera 202 will be described.

Figure 7:
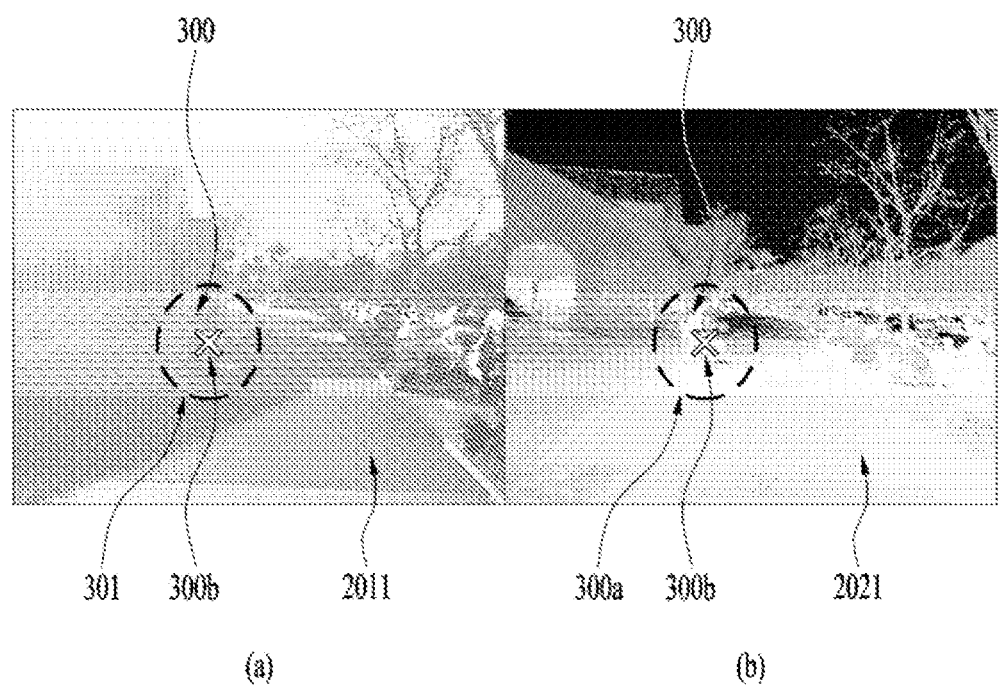
FIG. 7 is a view for explaining a method of obtaining 3D information from a true color image and an infrared image acquired by the non-identical stereo vision camera according to the present disclosure.

FIG. 7 is a view for explaining a method of acquiring 3D information from a true color image and an infrared image acquired by the non-identical stereo vision camera according to the present disclosure.

The non-identical stereo vision camera according to the present disclosure may extract a representative pixel of the subject 300 from an area corresponding to effective pixels of the true color image 2011, match the true color image 2011 and the infrared image 2012 based on the representative pixel, and obtain 3D information about the subject 300 through stereo vision operation.

The representative pixel may be one of pixels constituting the outline of the subject 300 or one of pixels constituting a frame 300a of the same shape surrounding the subject 300. In some cases, the representative pixel may be a center pixel 300b having a minimum distance difference to the pixels constituting the outline. Alternatively, the center pixel 300b may be selected by giving different weights to distances to pixels representing the appearance of the subject.

The distance to the subject 300 may be calculated based on the binocular disparity of the representative pixel.

The non-identical stereo vision camera according to the present disclosure may identify the subject 300 based on data generated by machine learning. According to the present disclosure, the distance to a main object may be discerned and calculated.

In the present disclosure, the infrared image 2012 acquired by the second camera 202 may be used to identify an object in an area corresponding to effective pixels. Hereinafter, a method of additionally identifying an object from the infrared image 2012 acquired by the second camera 202 will be described.

Figure 8:
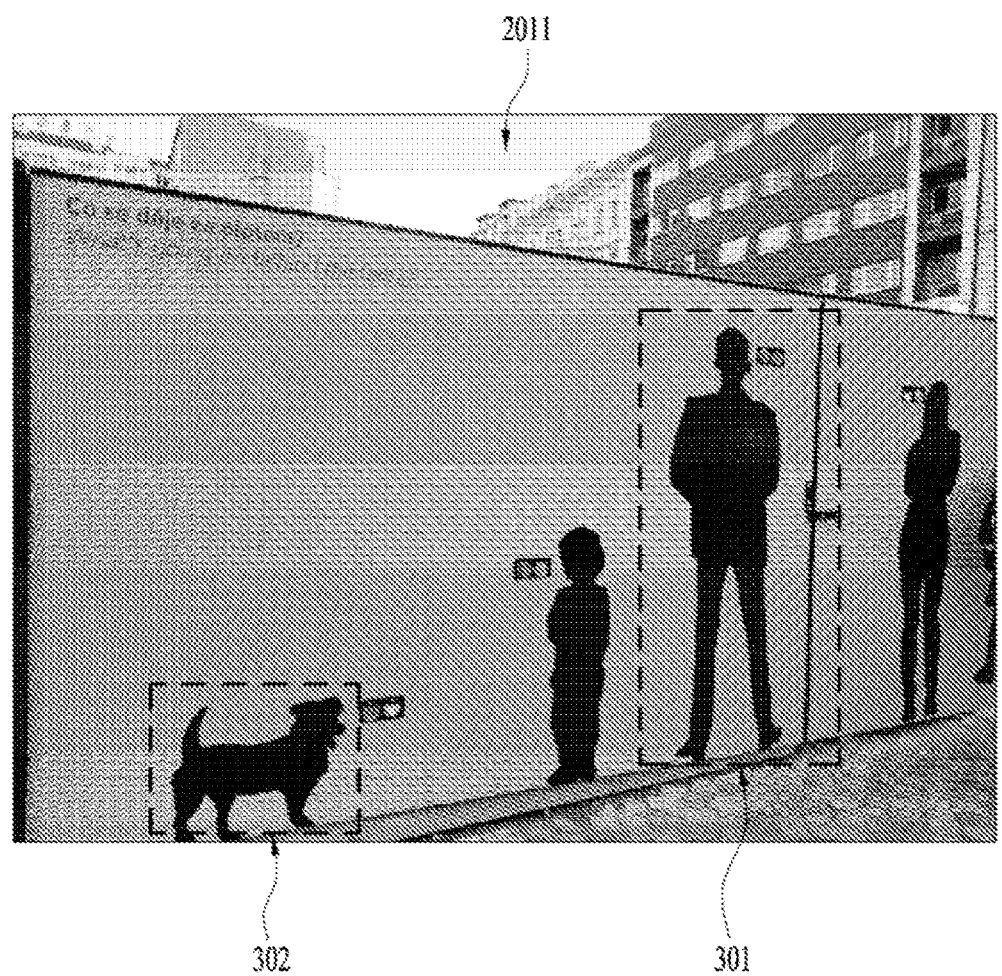
FIG. 8 is a view for explaining a method of identifying a specific object when the specific shape exists in a true color image obtained by the non-identical stereo vision camera according to the present disclosure.

FIG. 8 is a view for explaining a method of identifying a specific object when the specific shape exists in a true color image obtained by the non-identical stereo vision camera according to the present disclosure.

When the true color image 2011 includes only effective pixels, 2D information may be easily obtained by the first camera 201.

In the true color image 2011, the shape of a subject may be defined by distinguishing colors and singularities, and an object corresponding to the shape may be identified.

However, as illustrated in FIG. 8, when the shape is a picture or a signboard, it may be difficult to distinguish whether an actual object exists through the first camera 201.

That is, if it is determined by the first camera 201 that there are a person 301 and an animal 302, the determination may provide incorrect information to the user. Therefore, whether an object recognized by the first camera corresponds to an actual object may be confirmed based on 2D information acquired by the second camera 202.

For example, even if the shape of the person 301 is checked by the first camera 201, it may be determined based on heat distribution information obtained by the second camera 202 that the shape does not correspond to an actual person.

FIG. 9 shows an embodiment in which a specific object is emphasized and output based on an infrared image when the specific object is detected from a true color image obtained by the non-identical stereo vision camera according to the present disclosure.

When the subject 300 exists in an area corresponding to effective pixels of the true color image 2011, the non-identical stereo vision camera according to the present disclosure may extract information about the distance to the subject 300 from the infrared image 2012.

The extracted distance information may be provided to the user through an output interface.

When the subject 300 exists in an area corresponding to abnormal pixels of the true color image 2011, the non-identical stereo vision camera according to the present disclosure may identify the shape of the subject 300 from the infrared image 2012 and output information about the specific object to the user through the output interface. To output the information about the specific object, a warning message may be provided through at least one of a speaker and a display.

The non-identical stereo camera according to the present disclosure may provide at least one of the true color image 2011 and the infrared image 2012 on a display. Alternatively, the non-identical stereo camera may combine and provide the two images.

For example, when the subject 300 exists in an area corresponding to abnormal pixels of the true color image 2011, the non-identical stereo vision camera may check the subject 300 in the infrared image 2012 and then overlap and display a part of the infrared image 2012 by matching it to the area.

Alternatively, even when the subject 300 exists in an area corresponding to effective pixels of the true color image 2011, if it is difficult for the user to identify the subject 300 due to the amount of light, the non-identical stereo vision camera may overlap and display a part of the infrared image including the subject 300.

Specifically, FIG. 9(a) shows the true color image 2011 acquired by the first camera 201, FIG. 9(b) shows the infrared image 2012 acquired by the second camera 202, and FIG. 9(c) shows an image displayed on the display.

When a specific object 300 exists in an area corresponding to abnormal pixels of the true color image 2011 or in an area corresponding to effective pixels of the true color image 2011, if it is difficult for the user to identify the specific object 300, the non-identical stereo vision camera may overlap and display a part of the infrared image 212 that contains the specific object 300 on the true color image 2011 as shown in FIG. 9(c).

That is, the non-identical stereo vision camera has advantages in that the user may easily cope with this situation, that is, the user is capable of checking the presence of the specific object visually.

The above description is therefore to be construed in all aspects as illustrative and not restrictive. The scope of the present disclosure should be determined by reasonable interpretation of the appended claims and all changes coming within the equivalency range of the present disclosure are intended to be embraced in the scope of the present disclosure.

The invention claimed is:

1. An image processing apparatus comprising:
cameras configured to detect different wavelength bands, wherein: a first camera among the cameras is configured to obtain a true color image by capturing a subject; a second camera among the cameras is configured to obtain an infrared image by capturing the subject, wherein the second camera is spaced apart from the first camera; and
a controller configured to:
match the obtained true color image and the obtained infrared image;
obtain three-dimensional information about the captured subject in an area corresponding to effective pixels of the matched true color image from the matched infrared image; obtain two-dimensional information about an area corresponding to abnormal pixels of the matched true color image from the matched infrared image, wherein the obtained two-dimensional information comprises information about a presence of a specific object in the area corresponding to the abnormal pixels;
convert the abnormal pixels into the effective pixels based on raw data for obtaining the true color image based on a detection of the presence of the specific object from the two-dimensional information; and
obtain three-dimensional information about the specific object present in an area corresponding to the converted effective pixels.

2. The image processing apparatus of claim 1, wherein the effective pixels correspond to pixels that absorb light greater than or equal to a minimum amount of light for identifying an object and less than or equal to a saturation amount of light.

3. The image processing apparatus of claim 1, wherein the controller is further configured to coordinate a representative pixel of the captured subject among the effective pixels to the obtained infrared image, wherein the three-dimensional information is obtained based on a stereo vision operation.

4. The image processing apparatus of claim 3, wherein the representative pixel comprises at least one of an outline pixel of the captured subject or a center pixel of the captured subject.

5. The image processing apparatus of claim 1, wherein the controller is further configured to determine whether a shape of a specific object corresponds to the specific object based on information about a related area in the matched infrared image and based on recognition of the shape of a specific object in the area corresponding to the effective pixels.

6. An image processing apparatus comprising:
cameras configured to detect different wavelength bands, wherein: a first camera among the cameras is configured to obtain a true color image by capturing a subject a second camera among the cameras is configured to obtain an infrared image by capturing the subject, wherein the second camera is spaced apart from the first camera; and
a controller configured to:
match the obtained true color image and the obtained infrared image;
obtain three-dimensional information about the captured subject in an area corresponding to effective pixels of the matched true color image from the matched infrared image;
obtain two-dimensional information about an area corresponding to abnormal pixels of the matched true color image from the matched infrared image;
wherein the obtained two-dimensional information comprises information about a presence of a specific object in the area corresponding to the abnormal pixels; and
convert the abnormal pixels into effective pixels by adjusting at least one of an aperture, an exposure time, or an ISO of the first camera based on a detection of the presence of the specific object from the two-dimensional information.

7. The image processing apparatus of claim 6, wherein the controller is further configured to obtain three-dimensional information about the specific object present in the area corresponding to the abnormal pixels after adjusting the at least one of the aperture, the exposure time, or the ISO of the first camera.

8. The image processing apparatus of claim 1, further comprising an output interface, wherein the controller is further configured to output information about the specific object to a user through the output interface based on a detection of the specific object from the two-dimensional information.

9. The image processing apparatus of claim 8, wherein the output interface further comprises a display configured to display the obtained true color image, and wherein the controller is further configured to cause on the display a display of an infrared image of the specific object in the area corresponding to the abnormal pixels.

10. The image processing apparatus of claim 1, wherein the first camera corresponds to a camera configured to detect visible light and near-infrared (NIR) light.

11. The image processing apparatus of claim 1, wherein the second camera corresponds to a camera configured to detect at least one of far-infrared (FIR) light, mid-wave infrared (MWIR) light, or short-wavelength infrared (SWIR) light.

\* \* \* \* \*